United States Patent
Strömberg et al.

(10) Patent No.: US 6,360,715 B1
(45) Date of Patent: Mar. 26, 2002

(54) ENGINE COMBUSTION SYSTEM

(75) Inventors: Stefan Strömberg, Mölndal; Jonny Nisbet, Göteborg; Magnus Gustavsson, Hindås, all of (SE)

(73) Assignee: Volvo Car Corporation (SE)

(*) Notice: Subject to any disclaimer, the term of this patent is extended or adjusted under 35 U.S.C. 154(b) by 0 days.

(21) Appl. No.: 09/578,949

(22) Filed: May 25, 2000

Related U.S. Application Data

(63) Continuation of application No. PCT/SE98/02102, filed on Nov. 20, 1998.

(30) Foreign Application Priority Data

Nov. 26, 1997 (SE) .............................................. 9704344

(51) Int. Cl.$^7$ ................................................ F02B 31/04
(52) U.S. Cl. ................. 123/301; 123/298; 123/188.14
(58) Field of Search ................................. 123/301, 308, 123/276, 279, 298, 188.1, 188.4, 188.14, 302

(56) References Cited

U.S. PATENT DOCUMENTS

| | | | | |
|---|---|---|---|---|
| 4,883,032 A | * | 11/1989 | Hunter et al. ............... | 123/256 |
| 5,065,711 A | * | 11/1991 | Lesley ...................... | 123/188.4 |
| 5,065,712 A | * | 11/1991 | Hundleby .............. | 123/188.14 |
| 5,115,774 A |   | 5/1992  | Nomura et al. ............. | 123/276 |
| 5,170,455 A | * | 12/1992 | Goossen et al. .............. | 385/89 |
| 5,285,755 A | * | 2/1994  | Regueiro ................. | 123/193.6 |
| 5,305,720 A |   | 4/1994  | Ando et al. ............... | 123/193.4 |
| 5,551,393 A |   | 9/1996  | Amano et al. .............. | 123/306 |
| 5,913,297 A | * | 6/1999  | Jingu ........................ | 123/295 |
| 6,065,444 A | * | 5/2000  | Jingu et al. ................. | 123/301 |
| 6,129,066 A | * | 10/2000 | Umierski ................. | 123/193.6 |
| 6,138,639 A | * | 10/2000 | Hiraya et al. ............... | 123/295 |
| 6,148,792 A | * | 11/2000 | Hie Ma ....................... | 123/298 |

FOREIGN PATENT DOCUMENTS

| | | |
|---|---|---|
| EP | 0558072   | 9/1993 |
| JP | 8246877   | 9/1996 |
| JP | 972221 A  | 3/1997 |

* cited by examiner

Primary Examiner—Henry C. Yuen
Assistant Examiner—Hieu T. Vo
(74) Attorney, Agent, or Firm—Kilpatrick Stockton LLP

(57) ABSTRACT

A combustion system for engines having at least one cylinder (10). The system may e.g. consist of an exhaust duct, an intake duct (20a), a cylinder chamber (30), a fuel injector for injecting fuel into the cylinder chamber (30), a piston (40) performing a reciprocating motion in the cylinder chamber (30), and a valve (70) for intake and one for exhaust. The intake duct (20a) is connected to the cylinder chamber (30) and said intake valve (70) is operative to open and close, respectively, the connection between the intake duct (20a) and the cylinder chamber (30). The crown (60) of the piston (40) is provided with a cavity (50), shaped so as to enhance the generation of tumbling inside the cylinder chamber (30) during the intake stroke and to contribute to the breakdown during the compression stroke inside the cylinder chamber (30). The intake duct (20a) has an intermittent curve coinciding with the direction of the valve (70), where a longitudinal axis (110) of the valve (70) is angled towards the top (100) of the cylinder chamber (30), for generating the tumbling effect inside the cylinder chamber (30).

10 Claims, 4 Drawing Sheets

ENGINE COMBUSTION SYSTEM

RELATED PATENT APPLICATIONS

This is a continuation patent application of International Application Number PCT/SE98/02102 filed Nov. 20, 1998 that designates the United States. The full disclosure of said application, in its entirety, is hereby expressly incorporated by reference into the present application.

TECHNICAL FIELD

The present invention relates to a combustion system for engines having at least one cylinder.

BACKGROUND OF THE INVENTION

In today's combustion engines it is generally desirable to increase the output power of the engine. In order to achieve this, there are many different solutions. One method is to decrease the flow resistance in the intake duct resulting in an increased volumetric filling efficiency. This may, however, entail a deterioration of the combustion quality. This deterioration may also be caused by a difficulty in creating enough micro-turbulence during the combustion phase at low loads and rotational speeds. At too low turbulence levels, an unacceptably low combustion velocity is obtained, as well as excessive cycle-to-cycle variations of the output performance. One method of increasing the combustion quality is to raise the level of the so-called "tumble effect", an aspect that is generated in the combustion chamber during the intake or suction stroke. The tumble effect is defined as a rotating motion of the air volume moving transversely in relation to the cylinder between the top of a piston and the upper part of the cylinder chamber. In order to increase the tumble effect, the intake duct is normally designed in a special manner that will be described in more detail below, but which normally entails an increased flow resistance. This compromise is well known.

Referring to FIG. 1 that is included herewith, an illustration is provided depicting an intake duct 20a for a high flow (marked and denoted by dashed lines) and another one for high tumble that is superimposed thereupon (also marked, but denoted by full lines), each of which denote known systems and the differences of which will be explained below. Each one of these systems could be described generally as a combustion system for engines having at least one cylinder 10. The combustion system of the respective systems comprises at least one exhaust duct 20b, one intake duct 20a provided with a generally cylindrical wall 22,22a (respectively for the high flow intake duct and high tumble intake duct) and a cylinder chamber 30 (also called a combustion chamber) delimited by a top 100, (also called a cylinder head). A centerline 21a,21b (respectively for the high flow intake duct and high tumble intake duct) extends mainly along the center of the intake duct 20a. Further, the cylinder is provided with a cylinder head (not shown) having fuel injectors functioning to inject fuel into the intake duct 20a or directly into the cylinder chamber 30. A piston 40, provided with a head 60, also called a crown, performs a reciprocating motion inside the cylinder 10. Each cylinder is provided with at least one valve 70a for intake and one valve for exhaust 70b. The exhaust valve 70b will not be referred to in the remainder of this portion of the specification; therefore, any future references to a "valve" shall be read to refer to intake valve 70a. The valve 70a is arranged in a guide 72, guiding the valve 70a, where the guide has a longitudinal axis 110 which is angled relative to the top 100 of the cylinder chamber 30. This longitudinal axis touches the centerline 21a,21b of the intake duct 20a and defines a radius 23a,23b (respectively for the high flow intake duct and high tumble intake duct) therebetween, i.e. the radius is tangent to both the longitudinal axis and the centerline. The intake duct 20a is connected to the cylinder chamber 30 by means of a mouth 80 and the valve 70a is arranged to open and close the connection between the intake duct 20a and the cylinder chamber 30. The upper portion of the centerline 21a,21b, i.e. the portion of the centerline 21a,21b located upstream of the longitudinal axis 110 and the radius 23a, 23b, and the longitudinal axis 110, together define a bending angle 25a,25b. The centerline 21a,21b will touch the radius 23a, 23b, provided that the starting point for the radius 23a,23b is the same at the end towards the mouth 80.

In the intake duct 20a (dashed contour in FIG. 1) for high flow, the centerline 21a, starting from the mouth 80 of the duct in the cylinder chamber 30, has a preferably maximized radius 23a that touches the longitudinal axis 110 of the valve guide 72. This radius 23a is principally the same as the corresponding curve 24 of the wall 22 of the intake duct, starting from the mouth 80. In order to obtain a maximized radius 23a, the bending angle 25a will be minimized with regard to available upwards space in a manner allowing the duct to run free of the existing engine components. Existing components are defined as e.g. valve guides, valves, camshaft and seals. The curve of this type of intake duct will be intermittent. By using this type of intermittently curved intake duct, the flow capacity will increase, partly because the duct can adopt a lower angle of attack 27a,27 between the intake duct and the cylinder centerline 130. Another advantage, also contributing to increased flow, is that the air flow can be evenly distributed along the circumference of the valve. In a tumbling duct, the main part of the air flow is directed towards the upper part of the valve circumference. In a so called "filling duct", i.e. a duct for a high flow, the air flow is distributed as evenly as possible and will use the flow area maximally. The tumbling effect, however, will be reduced when this type of duct is used. Furthermore, it may be unfavorable to use a small valve angle, normally about 15°–20°, as this can lead to a relatively limited valve size and a high cylinder head which would require substantial modifications of existing production lines.

In the other case, where the intake duct 20a is configured for high tumbling effect, the centerline 21b, starting from the mouth 80 of the duct in the cylinder chamber 30, has a preferably minimized radius 23b that touches the longitudinal axis 110 of the valve guide 72. This radius 23b creates a curve 24a of the intake duct wall 22a, starting from the mouth 80, that then bends sharply at 24b towards the valve guide 72. In order to obtain a maximal guidance of the flow towards the top side of the valve, the bending angle 25b will be maximized with regard to available downwards space. By using this type of intermittently curved intake duct, the tumbling effect will increase, due to the shape of the duct. The flow capacity, however, will be decreased when using such a duct.

FIG. 2 displays a schematic diagram showing that the relationship between flow and tumbling level is inversely proportional, i.e. linear. The tumbling level may, e.g. be defined as the kinetic energy of the tumbling air mass. The flow in the diagram is the flow rate of air. If a comparison is made between the two designs shown in FIG. 1, one will find that if the radius is maximized according to 23a and the angle 25a is minimized, this will result in a duct having a lower tumbling level and a higher flow capacity. This comparison corresponds to point 10 in FIG. 2. If it were desirable to increase the flow and decrease the tumbling level, this design would be preferable. If another comparison is made between the two designs shown in FIG. 1, where the radius is minimized according to 23b and the angle 25b is maximized, this will result in a duct having a higher tumbling level and a lower flow capacity. This comparison corresponds to point 20 in FIG. 2.

Further, the crown 60 of the piston 40 may vary somewhat, depending on the application. The simplest form of the crown 60 of a piston 40 is of course a completely flat surface. In order to increase the tumbling effect, the crown 60 of the piston 40 may for example be provided with a bowl-shaped cavity (not shown). This cavity may, for example, be provided in the direction of the tumbling motion to support the creation of the tumbling motion. Furthermore, a ridge on the piston may be placed with an offset (not shown), arranged at an exhaust duct with the intention of gaining a more even flow.

When using an inlet duct in combination with a piston equipped with a cavity, where both designs contribute to an enhanced tumbling motion, the flow capacity will decrease, which in turn will cause the engine power output to decrease. The reason for the decrease in flow capacity is that the relationship between the flow and the tumbling motion generated by the inlet duct is linear, i.e. the flow is inversely proportional to the tumbling effect. Consequently, with an increased tumbling motion, a corresponding decrease in flow will be obtained.

As the combustion quality is, to a substantial degree, dependent of the tumbling gas motion that is achieved in the intake duct, and to the breakdown of this motion, it is desirable to try to find a way of increasing the flow capacity at a retained turbulence intensity during combustion in the engine. Moreover, it is desirable to increase the engine power output, while at the same time achieving a low fuel consumption with minimal pumping losses and without deterioration of the combustion quality, e.g. by controlling the tumbling motion in such a way as to influence the flow minimally. Pumping losses are defined as the work necessary to introduce air into a cylinder. High pumping losses will entail a lower performance on the engine shaft.

In view of the above described deficiencies associated with known combustion chambers in conventionally designed combustion engines, the present invention has been developed. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed combustion chambers and incorporates several additionally beneficial features.

An object of the present invention is to provide a device for a combustion engine that will increase flow capacity and thus power output, while also retaining high combustion quality at low loads and rotational speeds.

Another object is to decrease the fuel consumption and lower the pumping losses.

A further object is to be able to provide larger valve angles, which geometrically will allow larger valves, a lower cylinder head and also the possibility of using existing production lines for the manufacture of engines having one or more cylinders configured according to the present invention.

Still another object is to simplify the manufacturing process for producing the combustion engine, making it both less expensive and more simple than is otherwise common when producing a new combustion engine.

According to the present invention, the above objects are met by providing a combustion system in which a combination of two entirely different solutions are utilized: a low-tumbling, flow-enhancing intake duct and a piston equipped with a cavity. Through this combination, an advantageous system is obtained that is capable of increasing flow capacity while maintaining turbulence intensity during combustion in the engine, decreasing fuel consumption, achieving a high combustion quality and increasing the power output of the combustion engine.

Furthermore, existing tools and machinery can be used for production, as the valve angle can be maintained as it is by using an intake duct that is of known design. In this way the manufacturing process for a cylinder head can also be simplified and thus be made at a low cost.

The beneficial effects described above apply generally to the exemplary systems and methods for improving combustion chamber performance. The specifics through which these benefits are enabled will be described in detail hereinbelow.

BRIEF DESCRIPTION OF THE DRAWINGS

The invention will now be described in greater detail in the following way, by example only, and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
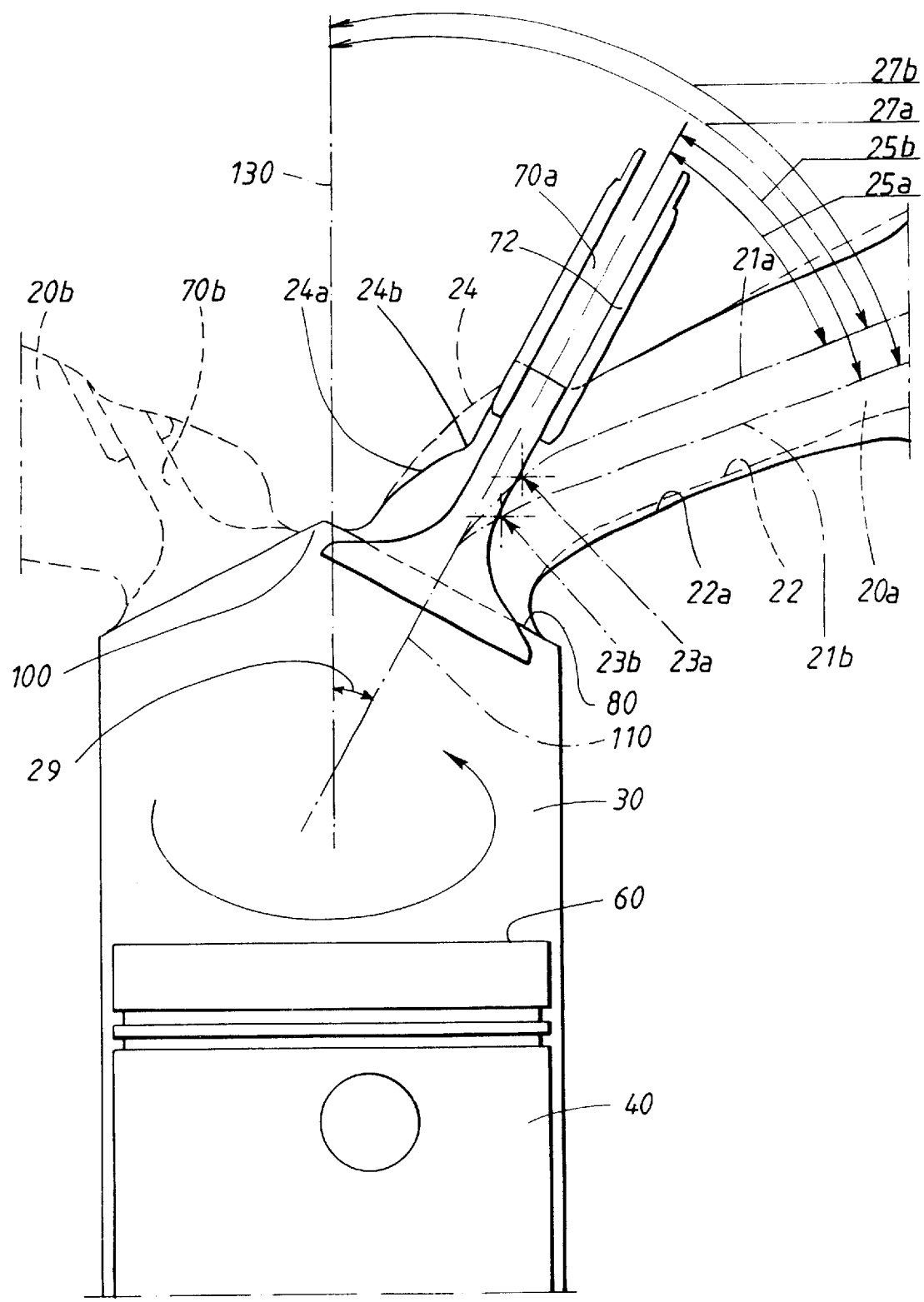
FIG. 1 shows a comparison between two known systems, one with an intake duct for high air flow and another with an intake duct having a tumbling effect.
Figure 2:
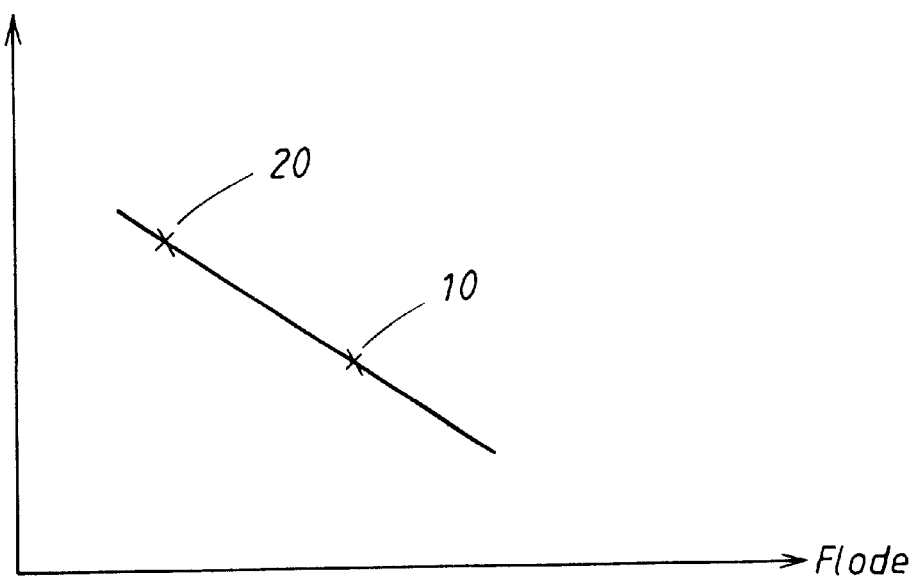
FIG. 2 shows a diagram of the relationship between tumble and flow.
Figure 3:
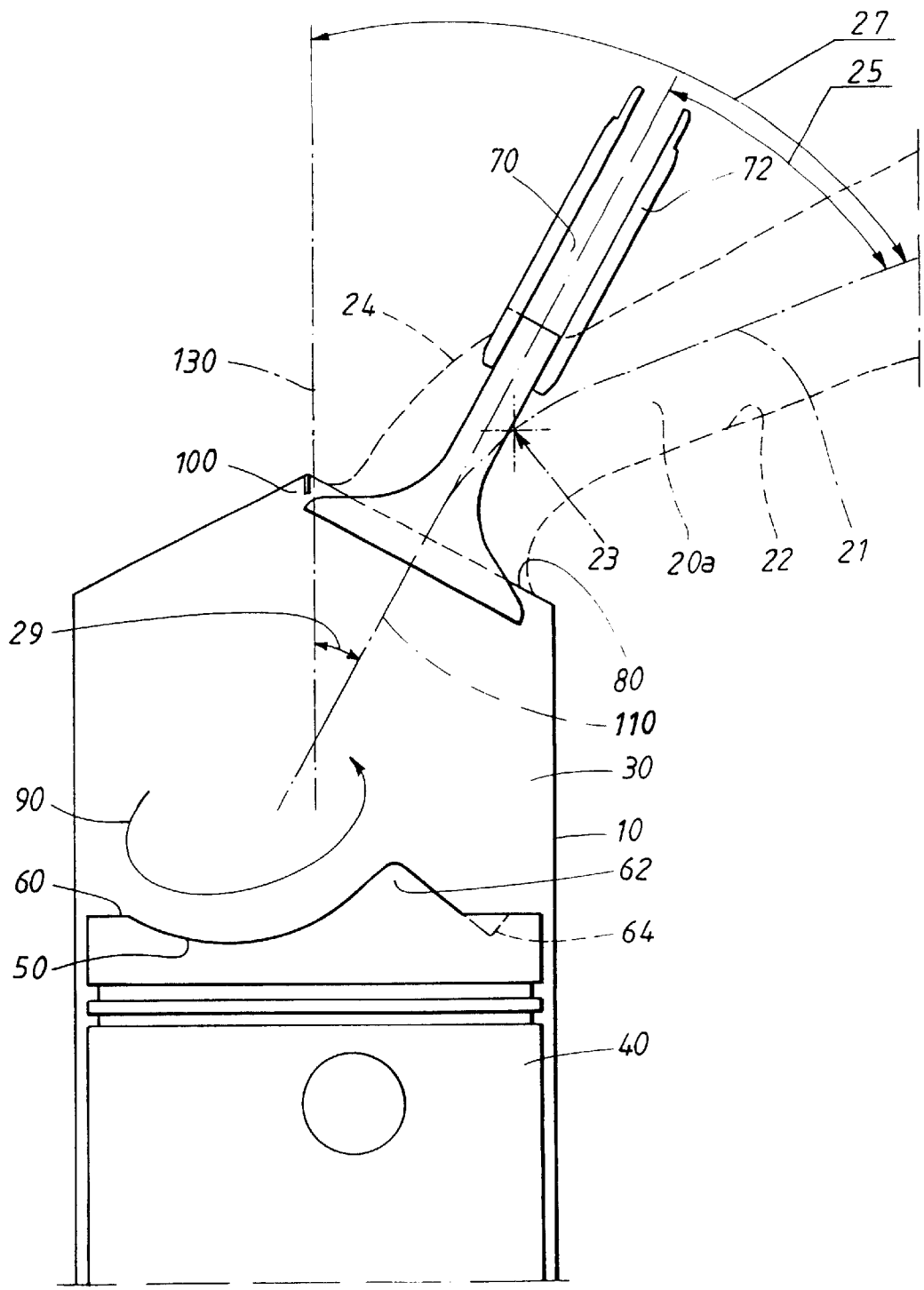
FIG. 3 shows a preferred embodiment of the present invention.

With reference to FIG. 3, a combustion system is shown for engines having at least one cylinder 10. The system includes at least one exhaust duct (not shown), one intake duct 20a having a generally cylindrical wall 22, a cylinder chamber 30 (also called a combustion chamber), delimited by a top 100, also called a cylinder head. A centerline 21 extends mainly along the center of the intake duct 20a. Further, the intake duct 20a is provided with a fuel injector (not shown) functioning to inject fuel into the intake duct 20a or directly into the cylinder chamber 30. A piston 40, provided with a head 60, also called a crown, performs a reciprocating motion inside the cylinder 10. Each cylinder is provided with a valve 70 for intake and a valve for exhaust (not shown). The exhaust valve will not be referred to in the following, and therefore references to "valve" will from now on refer to the intake valve 70. The intake valve 70 is arranged in a guide 72, guiding the valve 70, where the guide has a longitudinal axis 110 which is angled relative to the top 100 of the cylinder chamber 30. This longitudinal axis 110 touches the centerline 21 of the intake duct 20a. The intake duct 20a is connected to the cylinder chamber 30 via a mouth 80 and the valve 70 is arranged to open and close the connection between the intake duct 20a and the cylinder chamber 30. The upper portion of the centerline 21, i.e. the portion of the centerline 21 located upstream of the longitudinal axis 110 and the point where the radius 23 touches the centerline 21, and the longitudinal axis 110, together define a bending angle 25. Both the bending angle 25 and the radius 23 will be dependent of each other, as the radius will increase if the bending angle decreases, and vice versa. The straight line 21 passes into a center curve at the point where the centerline 21 touches the radius 23. According to the invention, the centerline 21, starting from the mouth 80 of the inlet duct in the cylinder chamber 30, has a preferably maximized radius 23, touching the longitudinal axis 110 of the valve guide. In order to obtain a maximum radius 23, the bending angle 25 created between the valve guide 72 and the intake duct 20a upstream of the radius 23 will be minimized regarding available upwards space, in a manner allowing the duct to run free of existing engine components. Existing components include such items as valve guides, valves, camshaft and seals. Consequently, this means that the mouth 80 of the intake duct has an intermittent curve 24, coinciding with the valve guide 72, i.e. with the longitudinal axis 110 of the guide, for limiting the tumbling effect inside the cylinder chamber 30, and where the wall runs along the curve 24, from the guide 72 guiding the valve 70, in a direction generally coinciding with an imaginary line extending from the mouth 80 of the intake duct.

By using this type of intermittently curved intake duct, the flow capacity will increase, due to the shape of the duct. However, the tumbling effect will be reduced when this type of duct is used. To increase the tumbling intensity, energy is required as a vortex is created, and thereby the flow capacity will be reduced in those cases where it is desirable to create a higher tumble inside the cylinder chamber.

Figure 4:
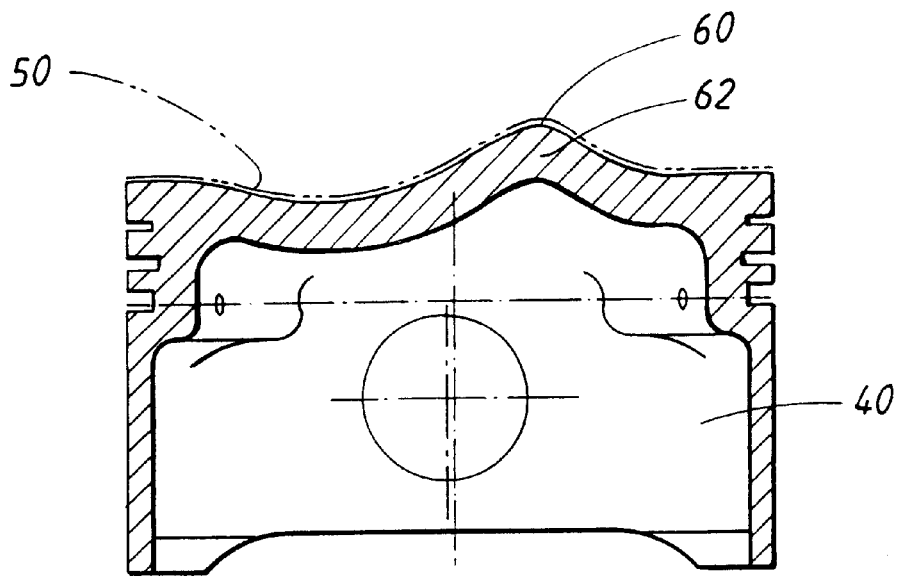
FIG. 4 shows a cross-section of the piston of FIG. 3.
Figure 5:
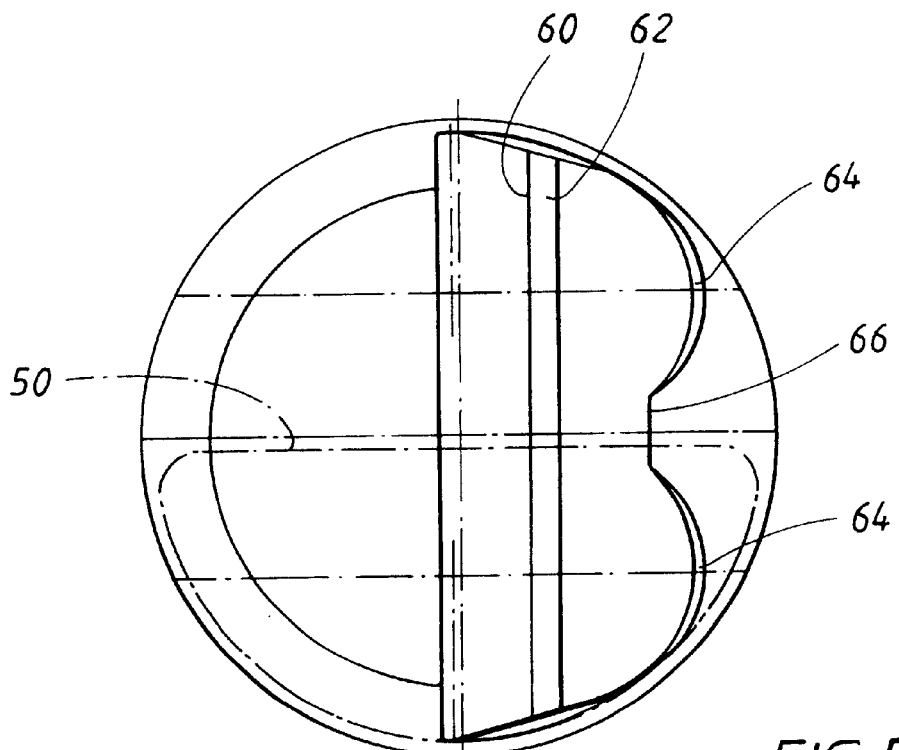
FIG. 5 shows a top plan view of the piston of FIG. 3.

Further, according to the invention the tumbling effect is increased inside the cylinder chamber 30, without affecting the flow, by the crown 60 of the piston 40 being provided with a preferably cylindrical cavity 50, as shown in FIGS. 3, 4 and 5, which is shaped so as to enhance the generation of tumbling in the cylinder chamber 30 during the intake stroke and to contribute to the breakdown of the tumbling into turbulence during the compression stroke. Of course this cavity may take other shapes than cylindrical, such as bowl-shaped or similar. Said cavity may be located on one half of the piston, see FIG. 5, running across the crown 60 of the piston 40. From FIGS. 3, 4 and 5 it can further be seen that the piston crown 60 may be provided with a ridge 62 adjacent to the cavity 50. The ridge 62 may run with constant level across the piston crown 60. Furthermore, the piston may be provided with one or more valve pockets 64 to avoid collisions with partly open valves. This type of piston 40 will thus enhance the generation of tumble in the combustion chamber during the intake stroke, while at the same time, the piston shape will contribute to a breakdown of the tumbling into turbulence during the compression stroke.

Consequently, this means that just as high a tumble intensity, and thereby just as advantageous combustion properties can be achieved as when using an intake port with a high tumbling level, but will also permit a flow capacity that is higher than normally allowed by such an intake port.

The port according to this invention can provide a flow capacity increase of at least 10% compared to what is normally accommodated. The more efficient tumbling breakdown will provide decreased rest tumbling and thus lower knock sensitivity due to less offset of the flame center (not shown) towards that side where the exhausts are discharged. An initially low tumble will contribute to lower cooling and pumping losses. Together, this leads to a lower specific fuel consumption.

The centerline 110 of the intake duct approaches the top of the cylinder chamber at an angle 27 that may vary from 0° to 180°, preferably from 20° to 35° and most preferably about 30°, relative to the cylinder chamber centerline 130. The angle 27 should be as small as possible, with regard to available space. The curve to the intake duct may vary between 0–180°. For a modern car engine this curve is usually between 30–90° and most preferably 50°.

A further embodiment form is that the intake duct may be a falling duct, falling in towards the top of the cylinder chamber between the exhaust and intake valves. The same geometrical construction with an intermittent curve is possible also in this case.

Even though the demonstrated embodiments of the present invention have been described in detail with reference to the accompanying drawings, it should be understood that the invention will not be limited to these specific embodiments and that various changes or modifications can be made by someone skilled in the art, without deviating from the scope defined by the following patent claims. For example, one variation would be to use more than one sparkplug, for each cylinder, as well as more than one intake and/or exhaust valve.

What is claimed and desired to be secured by letters patent is as follows:

1. A combustion system for an engine having at least one cylinder, said system comprising:
   an intake duct;
   a combustion chamber delimited by a head portion and wall portion, and having a centerline;
   an intake valve arranged in a guide for reciprocating motion therein between open and closed configurations in which fluid communication between said intake duct and said combustion chamber is allowed and prohibited, respectively;
   a piston arranged for reciprocating motion within said combustion chamber, said piston having a crown provided with a cavity exposed to an interior space of said combustion chamber and said cavity being configured to enhance tumbling action inside said combustion chamber during an intake stroke of said combustion system and said cavity being further configured to breakdown said tumbling action into turbulence during a compression stroke of said combustion system; and
   said intake duct being configured so that a centerline of said intake duct is coincident with a centerline of said intake valve at a mouth into said combustion chamber for enhanced flow capacity from said intake duct into said combustion chamber.

2. A combustion system as recited in claim 1 wherein said crown of said piston further comprises a valve pocket configured to receive at least a portion of said intake valve therein in the event that said piston contacts said intake valve during said compression stroke.

3. A combustion system as recited in claim 1 wherein said crown of said piston further comprises a plurality of valve pockets, each configured to receive at least a portion of said intake valve therein in the event that said piston contacts said intake valve during said compression stroke.

4. A combustion system for engines, having at least one cylinder, said system comprising:

an exhaust duct;

an intake duct;

a cylinder chamber delimited by a cylinder head, said cylinder chamber including a centerline and a generally cylindrical wall;

a fuel injector for injecting fuel into said cylinder chamber or said intake duct;

an exhaust valve;

an intake valve arranged in a guide for guiding said valve, said valve being directed towards a mouth leading into said cylinder chamber, said intake duct being connected to said cylinder chamber and said intake valve being operative to open and close a connection between said intake duct and said cylinder chamber; and a piston having a crown, said piston performing a reciprocating motion in said cylinder and said crown of said piston being provided with a cavity shaped so as to enhance the generation of tumbling inside the cylinder chamber during an intake stroke and to contribute to the breakdown of the tumbling into turbulence during the compression stroke, said intake duct exhibits an intermittent curve and an angle of approach of the intermittent curve immediately upstream of the mouth coincides with the longitudinal axis of the valve guide in order to increase the flow capacity of the intake duct.

5. A combustion system as recited in claim 1, wherein said crown of said piston is provided with a ridge adjacent to said cavity.

6. A combustion system as recited in claim 1 wherein said intake duct approaches the top of said cylinder chamber at an angle which is minimized with regard to available space and which varies from 0° to 180° relative to said centerline.

7. A combustion system as recited in claim 6, wherein said angle is between 20° and 35°.

8. A combustion system as recited in claim 6, wherein said angle is approximately 30°.

9. A combustion system as recited in claim 1 wherein said valve exhibits an angle of approach, relative to said cylinder chamber, that touches the curve to said intake duct.

10. A combustion system as recited in claim 1 wherein said curve to said intake duct is maximized with regard to available space.

* * * * *